US012574655B1

(12) United States Patent
Wang

(10) Patent No.: US 12,574,655 B1
(45) Date of Patent: Mar. 10, 2026

(54) 3D GIGAPIXEL PLENOPTIC IMAGING DEVICE

(71) Applicant: Triad National Security, LLC, Los Alamos, NM (US)

(72) Inventor: Zhehui Wang, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 370 days.

(21) Appl. No.: 18/131,834

(22) Filed: Apr. 6, 2023

Related U.S. Application Data

(60) Provisional application No. 63/328,095, filed on Apr. 6, 2022.

(51) Int. Cl.
| | |
|---|---|
| *H04N 23/95* | (2023.01) |
| *G01T 1/20* | (2006.01) |
| *H04N 13/282* | (2018.01) |
| *H04N 23/957* | (2023.01) |
| *H04N 25/10* | (2023.01) |
| *H04N 25/30* | (2023.01) |
| *H04N 25/79* | (2023.01) |

(52) U.S. Cl.
CPC ......... *H04N 23/957* (2023.01); *G01T 1/2002* (2013.01); *G01T 1/2006* (2013.01); *H04N 13/282* (2018.05); *H04N 25/10* (2023.01); *H04N 25/30* (2023.01); *H04N 25/79* (2023.01)

(58) Field of Classification Search
CPC ..... H04N 23/957; H04N 13/282; H04N 25/30
See application file for complete search history.

(56) References Cited

U.S. PATENT DOCUMENTS

| | | | | |
|---|---|---|---|---|
| 2017/0234985 | A1* | 8/2017 | Kadambi | .............. G01S 17/894 |
| | | | | 702/152 |
| 2017/0307439 | A1* | 10/2017 | Caucci | .................. G01J 1/0414 |
| 2018/0372926 | A1* | 12/2018 | Karafin | .............. G02B 6/02042 |
| 2019/0170575 | A1* | 6/2019 | Caucci | ...................... G06T 5/50 |
| 2022/0336511 | A1* | 10/2022 | Barbour | .................. H10F 77/40 |
| 2024/0061166 | A1* | 2/2024 | Karafin | .............. G02B 27/1066 |

* cited by examiner

*Primary Examiner* — Hugh Maupin
(74) *Attorney, Agent, or Firm* — SQUIRE PATTON BOGGS (US)

(57) ABSTRACT

Described are embodiments of a multi-layer giga-pixel plenoptic camera that enable three-dimensional (3D) light-field imaging, high resolution and large field-of-view. In embodiments, the camera includes a radiation conversion array layer, an optics array layer, a complementary metal-oxide-semiconductor (CMOS) image sensor array layer, and a memory layer. Depending on the embodiment, the sequence of the radiation conversion array layer and the optics array layer may be reversed, and/or additional isola-tion layers may be provided between some of the layers. Applications can span the visible light spectrum, and can include ultraviolet (UV) and infrared (IR) spectra. In an embodiment, applications can span x-ray spectra and gamma ray spectra. Radiation converters in the radiation conversion array layer can be filters or scintillation convert-ers. Optics in the optics array layer can be lenses or pinholes and/or coded apertures.

20 Claims, 6 Drawing Sheets

130'

130-n"

130-n-1"

130-2"

130-1"

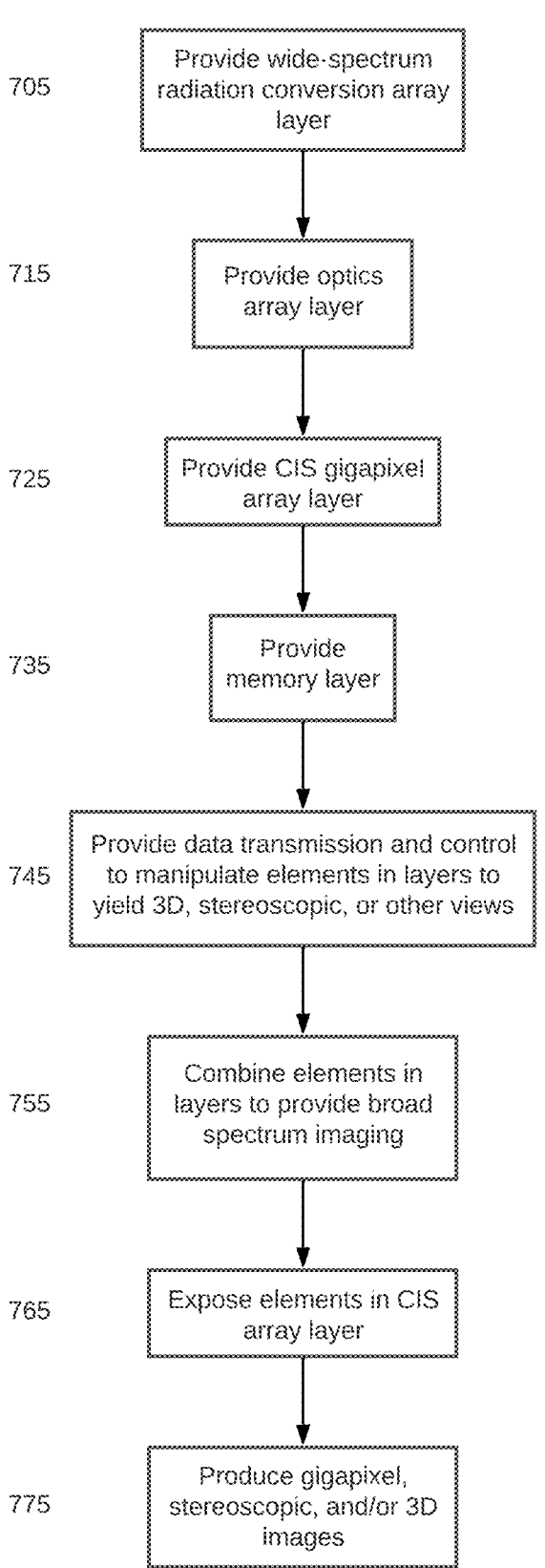

705     Provide wide-spectrum radiation conversion array layer

715     Provide optics array layer

725     Provide CIS gigapixel array layer

735     Provide memory layer

745     Provide data transmission and control to manipulate elements in layers to yield 3D, stereoscopic, or other views 755     Combine elements in layers to provide broad spectrum imaging 765     Expose elements in CIS array layer 775     Produce gigapixel, stereoscopic, and/or 3D images

FIG. 7

3D GIGAPIXEL PLENOPTIC IMAGING DEVICE

CROSS-REFERENCE TO RELATED APPLICATIONS

The present application claims benefit of U.S. Provisional Application No. 63/328,095, filed Apr. 6, 2022. The contents of that provisional application are incorporated by reference in their entirety.

ACKNOWLEDGMENT OF GOVERNMENT SUPPORT

This invention was made with government support under Contract No. 89233218CNA000001, awarded by U.S. Department of Energy. The government has certain rights in the invention.

BACKGROUND OF THE INVENTION

Taking large images in order to get high resolution and large field of view simultaneously has required stitching plural images together. Where there are large numbers of pixels (one billion pixels or more), alignment of the plural images can be problematic, particularly where high accuracy is required, as in reconstruction of 3D scenes.

It would be desirable to provide a camera capable of obtaining gigapixel images, including three-dimensional (3D) gigapixel images, including not only visible images but also X-ray images, in a single exposure.

SUMMARY OF THE INVENTION

A 3D gigapixel plenoptic camera (GIPC-3D) has a wide spectral range, capable of capturing, in a single exposure, visible images as well as X-ray images, depending on the optics array and sensor materials provided. Relative positions of the camera sensors and optics may be fixed so as to eliminate the need for calibration (including camera positions and orientations) to stitch together a gigapixel image using megapixel or other sub-gigapixel imaging sensors.

In an embodiment, an X-ray radiation conversion array and an optics array are disposed over a CMOS imaging sensor (CIS) array. There may be one or more optics elements per CIS, and/or one or more radiation converters per CIS. Different radiation converters may be disposed in the radiation conversion array, each working with a corresponding optics element in the optics array to facilitate the provision of 3D images or images for 3D reconstruction of the scene.

In an embodiment, the sensor arrays, optics arrays, radiation conversion arrays, and the like are planar. In an embodiment, they are curved. Curvature of one or more of the arrays may enable different kinds of views of objects to be imaged. Depending on the embodiment, a radiation conversion array may comprise a plurality of filters to facilitate production of gigapixel images, including 3D images or images for 3D reconstruction of the scene. In an embodiment, the radiation conversion array may comprise a plurality of scintillator converters to facilitate production of gigapixel X-ray images. Depending on the embodiment, an optics array may comprise a plurality of lenses to facilitate production of gigapixel images, including 3D images or images for 3D reconstruction of the scene with X-ray imaging. In an embodiment, those lenses may be microlenses. In an embodiment, the lenses may be metasurface lenses. In an embodiment, the optics array may comprise an array of pinholes, or an array of coded apertures, or a combination of pinholes and coded apertures, among other combinations, to facilitate production of gigapixel X-ray images.

In an embodiment, the inventive imaging device employs a multi-layered approach in which the sensor arrays are tiled, enabling a greater field of view and also enabling gigapixel images to be recorded in a single exposure rather than being taken in individual sections and then pieced together.

In an embodiment, rather than piecing together a plurality of images taken in individual sections, the CIS array may enable the taking of pairs of images to provide a stereoscopic view. Optics associated with respective elements of the array may be positioned relative to the object being imaged to enable a pair of images to be combined to provide the stereoscopic view of the image.

BRIEF DESCRIPTION OF THE DRAWINGS

Embodiments according to aspects of the present invention now will be described in detail with reference to the accompanying drawings, in which:

FIG. 7 is a high level flow chart depicting a method according to embodiments.

DETAILED DESCRIPTION OF EMBODIMENTS

Figure 1:
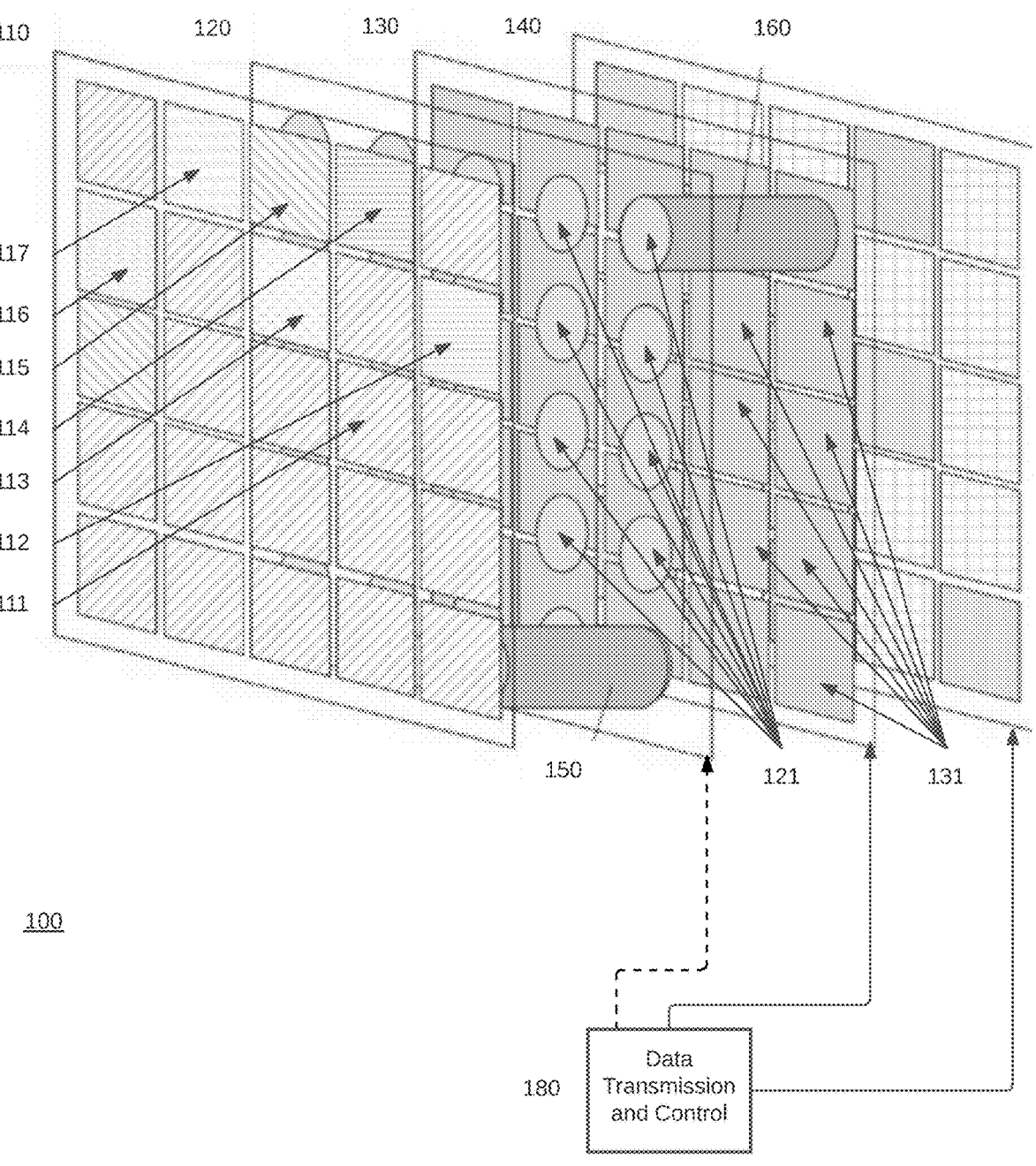
FIG. 1 depicts an arrangement of elements of a GIPC-3D camera according to an embodiment.

FIG. 1 shows an embodiment of a GIPC-3D camera 100, with wide-band spectrum (including X-rays) radiation conversion array layer 110, optics array layer 120, CMOS imaging sensor (CIS) array layer 130, and floating point gate array (FPGA) and memory layer 140. In an embodiment, data transmission and control apparatus 180 may connect CIS array layer 130 and FPGA and memory layer 140. Depending on the embodiment, either data transmission and control apparatus 180, or another electronic control apparatus, may be provided to manipulate individual elements, or groups of elements, in optical array layer 120 to facilitate the formation of different images of objects from different views. As discussed herein, different combinations of elements in CIS array layer 130, in combination with different elements in optics array layer 120, may be employed to provide stereoscopic views of objects to be imaged. In this fashion, one or more combinations of elements in CIS array layer 130 may be employed to provide stereoscopic views of objects to be imaged without moving the camera 100 relative to the objects. Furthermore, different combinations of elements in CIS array layer 130, in combination with different elements in radiation conversion layer 110, may be employed to provide wide spectrum imaging of objects. In this fashion, embodiments may include one or more combinations of elements in the layers to provide imaging of an object over a broad spectrum (including X-rays) with a single device. Other embodiments of GIPC-3D camera 100 may include some of the layers shown in FIG. 1 but not others. Yet other embodiments, may include additional layers, for example additional filters or optic layers, not shown in the figures.

In an embodiment, an additional isolation or coupling layer 150 may be provided between the radiation conversion array layer 110 and the optics array layer 120, to prevent crosstalk from neighboring elements in the layer. In an embodiment, an additional isolation or coupling layer 160 may be provided between optics array layer 120 and CIS array layer 130. In an embodiment, both of the isolation or coupling layers 150, 160 may be provided, again to prevent crosstalk from neighboring elements in the layer. In FIG. 1, a single guide tube is shown to represent the layer 150, it being understood that there will be one such guide tube for each element in radiation conversion array 110 and each element in optics array layer 120 in these embodiments. Also, a single guide tube is shown to represent the layer 160, it being understood that there will be one such guide tube for each optics element in optics array layer 120, and each sensor in CIS array layer 130 in these embodiments.

FIG. 1 shows an embodiment in which radiation conversion array layer 110 has exemplary radiation converters 111, 112, 113, 114, 115, 116, and 117, which all may be the same type of radiation converter, or may be different types from each other. In an embodiment, every radiation converter in radiation conversion array layer 110 may be different. The flexibility of GIPC-3D camera 100 to include different types of radiation converters allows it to image an object over a broad spectrum, e.g., a broad spectrum of X-rays, X-rays and visible, etc.

In an embodiment, each of the radiation filters in radiation conversion array layer 110 may be arranged anywhere on that layer 110, in any location desired, and in any proportion desired (so long as the total number of radiation converters equals the number of optical elements in optics array layer 120). Depending on the embodiment, all of the radiation converters in radiation conversion array layer 110 may be the same in some embodiments. Depending on the embodiment, radiation conversion array layer 110 may have its elements arranged to work with groups of sensors in CIS array layer 130. In such embodiments, the elements in radiation conversion array layer 110 may have a number equal to the number of groups of sensors in CIS array layer 130. In that event, there will be more sensors than there are radiation conversion array elements.

In an embodiment, optics array layer 120 may comprise a plurality of optical elements 121. Depending on the embodiment, the optical elements 121 may be the same, or there may be more than one different type of optical element. Optical element selection and configuration can depend on the desired optical effect (alone or in combination with the radiation converters in radiation conversion array layer 110). Optical element configuration also can depend on the technique used to fabricate the elements.

In an embodiment, GIPC-3D camera 100 uses filters as radiation converters in radiation conversion array layer 110, and lenses as optical elements in optics array layer 120. The lenses 121 may employ a variety of optics, including complex optics with spherical or aspherical lenses, depending on the effect desired and the images and/or image effects desired. In an embodiment, the lenses 121 in optics array layer 120 can provide a wide field of view for the GIPC-3D camera 100. In an embodiment, the lenses 121 may be microlenses. In an embodiment, one or more, or all of the lenses 121 in optics array layer 120 may be tuned electronically. In an embodiment, the lenses may be metasurface lenses. Ordinarily skilled artisans will appreciate that metasurface lenses may be tuned electronically or by temperature variance.

In an embodiment, CIS array layer 130 may comprise a plurality of CIS 131. The CIS 131 may be the same, or they may be different depending on the embodiment. In an embodiment, there are as many CIS 131 in CIS array layer 130 as there are optical elements in optics array layer 120. Depending on the embodiment, optical elements and/or the elements of radiation conversion array layer may be grouped to work with respective groups of CIS in the CIS array layer 130. In an embodiment, there may be fewer optical elements than there are CIS, so that groups of CIS may work with particular optical elements.

The number of CIS in CIS array layer 130 can depend on CIS format. Lower-capacity CIS can be tiled in larger numbers; higher-capacity CIS can be tiled in smaller numbers. In an embodiment, CIS on the order of 12 megapixels (MP) can be tiled in a 10×10 configuration to build a CIS array of a gigapixel or more. In an embodiment, a CIS on the order of 24 MP can be tiled in a 5×5 configuration to build a camera of a gigapixel or more. In an embodiment, a CIS on the order of 64 MP can be tiled in a 4×4 configuration to build a CIS array of a gigapixel or more. In an embodiment, a CIS on the order of 128 MP can be tiled in a 3×3 configuration to build a CIS array of a gigapixel or more. The flexibility of creating a CIS array of any size and in any arrangement to achieve the desired imaging results, provides advantages to the embodiments of GIPC-3D camera 100 over currently available systems.

Depending on the image effect desired, CIS of different sizes may be used. For example, a mixture of 10 MP and 20 MP CIS may be used. In an embodiment, smaller CIS may be used in an outer portion of CIS array 130, and larger CIS may be used in an inner portion of CIS array 130. Optics may be varied as desired to accommodate different CIS capacities and arrangements.

Individual pixel size also can matter to resolution as well as to frame rate. Accordingly, a CIS 131 may have a variety of resolutions and pixel sizes. In an embodiment, pixel size is sub-micron. Depending on the embodiment, for purposes of processing, pixels may be combined or binned, for example, in groups of four. In such a configuration, where each pixel may have a red, blue, or green component (or more than one of these), in an embodiment, the distribution of red, blue, and green, or any other color by using a matching filter in layer 110 among the four pixels may vary as desired.

In an embodiment, the optics array layer 120 need not be a physically separate layer from the CIS array layer 130. In such an embodiment, lenses can be fabricated directly on the CIS in CIS array layer 130. Whether there is a physically separate optics array layer 120 or optical elements directly contacting and overlaying the CIS, in an embodiment, 3D printing would be a non-limiting example of a fabrication technique for the lenses. As ordinarily skilled artisans will appreciate, 3D printing can enable fabrication of complex optics on the CIS in CIS array layer 130.

Whether the lenses are part of a separate optics array layer 120 or are fabricated directly on the CIS in CIS array layer 130, depending on the embodiment the lenses may all be the same; they may all be different; or fewer than all of the lenses may be different.

In an embodiment in which lenses 121 are fabricated directly on the CIS in CIS array layer 130, isolation or coupling layer 160 would not be present.

In conjunction with lenses in optics array layer 120, using different filters in some of all of the different positions can provide a wide field of view to help produce a gigapixel image in a single exposure. In an embodiment, different combinations of lenses and filters also can provide varying depth of field and spectral sensitivity, and can provide a 3D gigapixel image through reconstruction algorithms and corresponding computing hardware.

Different types of complex optics, including multiple-layer lenses, combinations of concave and convex lenses, or spherical or aspherical lenses, can yield the types of optical effects which, in conjunction with filters in radiation conversion array 110, can transmit images to different portions of the CIS in CIS array layer 130, again affecting field of view and depth of field.

In an embodiment, FPGA and memory layer 140 employs one or more FPGA, depending on the number and capacity of CIS. Memory may be contained in individual FPGA, or may be located elsewhere in the FPGA and memory layer 140. In an embodiment, the FPGA and memory layer 140 has a single FPGA that handles all of the image data from the CIS in CIS array layer 130. In an embodiment, there may be one or more FPGA, which receive as input the image data output from one or more CIS in CIS array layer 130. One or more algorithms may be performed in each FPGA to configure and/or preliminarily process the image data appropriately for output and additional postprocessing offline.

In an embodiment, data transmission and control apparatus 180 may facilitate transmission from individual CIS in CIS array layer 130 to corresponding FPGA in FPGA and memory array layer 140. In an embodiment, data transmission and control apparatus 180 may facilitate transmission from multiple CIS in CIS array layer 130 to a single FPGA in FPGA and memory array layer 140. In an embodiment, data transmission and control apparatus 180 may facilitate transmission from all of the CIS in CIS array layer 130 to a single FPGA in FPGA and memory array layer 140. In an embodiment, data transmission and control apparatus 180 may facilitate transmission from all CIS in CIS array layer 130 to an FPGA of a corresponding number of FPGA in FPGA and memory array layer 140. Details of implementation of such data transmission and control apparatus will be within the abilities of ordinarily skilled artisans.

Depending on the embodiment, output from the memory array layer 140 (or each FPGA) can be to temporary (volatile or transitory) or permanent (non-volatile and/or non-transitory) storage, or to a High-Definition Multimedia Interface (HDMI), Universal Serial Bus (USB), Digital Video Interface (DVI), DisplayPort, Mini DisplayPort, Thunderbolt, or other output for display, or for further processing in another processing system. Particular version numbers for the just-mentioned outputs are deliberately omitted so as not to give rise to an inference of particular versions. In addition, the foregoing listing of outputs is not intended to be exhaustive, but rather is intended to be exemplary.

In an embodiment, radiation conversion array layer 110 may be replaced by, or may additionally include, an optional scintillator converter or a plurality of scintillator converters to provide an X-ray version of the GIPC-3D camera. A scintillator converter can convert X-rays to visible light. In an embodiment, a cerium-doped lutetium-based scintillator (also called a Lutetium Yttrium Orthosilicate or a LYSO scintillator) may be used. In another embodiment, a bismuth germanium oxide (BGO) scintillator may be used. In yet another embodiment, a lutetium oxyorthosilicate (LSO) scintillator may be used. In still another embodiment, a lutetium aluminum garnet (LuAG) scintillator may be used.

In still yet another embodiment, an yttrium orthosilicate (YSO) scintillator may be used. Thallium doped cesium iodide (CsI(TI)) is another type of scintillator that may be used. Ordinarily skilled artisans will appreciate that the scintillators enumerated here do not constitute an exhaustive list, but rather are exemplary. Ordinarily skilled artisans also will appreciate that different scintillators will handle different energies and/or wavelengths of X-rays or gamma rays. Some scintillators will handle some energies and/or wavelengths better than others. Different combinations of scintillators may be used to allow imaging over a broad X-ray spectrum.

For X-ray embodiments of the GIPC-3D camera, optics array layer 120 may comprise a plurality of pinholes (in an embodiment, one for each CIS in CIS array layer 130), or a plurality of coded apertures (again, one for each CIS in CIS array layer 130). Depending on the embodiment, each pinhole may be located in a different position relative to a respective CIS to provide different exposure on the CIS. Ordinarily skilled artisans will appreciate that coded apertures may cast a shadow of some kind upon a plane (in this case, a plane comprising a CIS) by providing a number of patterns of opaque and transparent regions overlying a CIS. In an embodiment, optics array layer 120 may comprise both pinholes and coded apertures in any desired combination.

Figure 2:
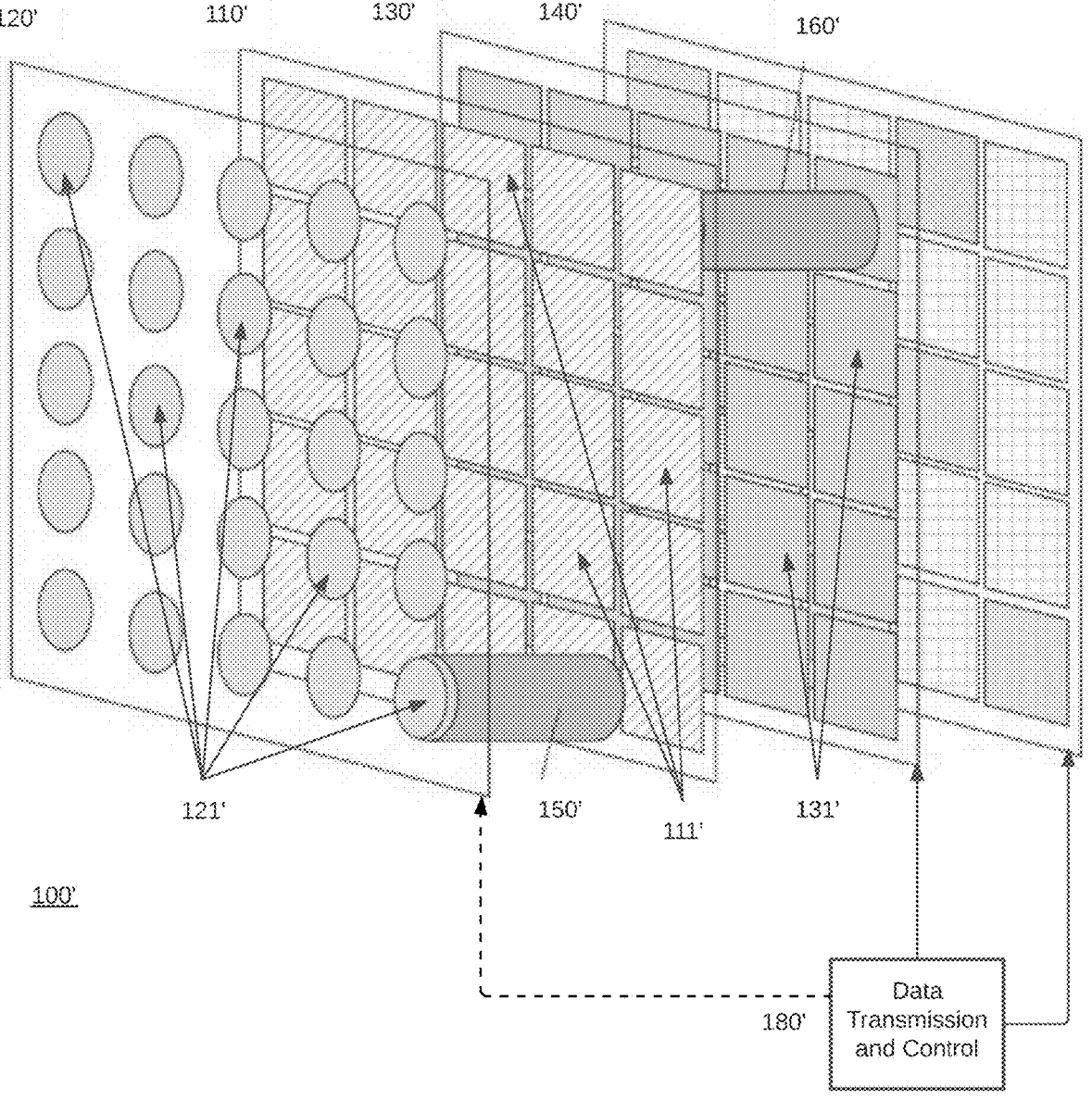
FIG. 2 depicts an arrangement of elements of a GIPC-3D camera according to an embodiment.

FIG. 2 shows a variant of FIG. 1 in which the order of the radiation conversion array layer 110' and the optics array layer 120' is flipped. In FIG. 2, according to an embodiment radiation conversion array layer 110' may comprise a plurality of filters 111'. As with embodiments of FIG. 1, the filters 111' in radiation conversion array layer 110' may all be the same; they may all be different; or fewer than all may be the same. Also in FIG. 2, in an embodiment the optics array layer may comprise a plurality of lenses 121'. As with embodiments of FIG. 1, the lenses 121' in radiation conversion array layer 120' may all be the same; they may all be different; or fewer than all may be the same. As noted earlier, different combinations of filters with different lenses can improve field of view and depth of field to facilitate the capturing of a gigapixel image in a single exposure.

In an embodiment, data transmission and control apparatus 180' may connect CIS array layer 130' and FPGA and memory layer 140'. Depending on the embodiment, either data transmission and control apparatus 180', or another electronic control apparatus, may be provided to manipulate individual elements, or groups of elements, in optical array layer 120' to facilitate the formation of different images of objects from different views. As discussed herein, different combinations of elements in CIS array layer 130', in combination with different elements in optics array layer 120', may be employed to provide stereoscopic views of objects to be imaged. In this fashion, one or more combinations of elements in CIS array layer 130' may be employed to provide stereoscopic views of objects to be imaged without moving the camera 100' relative to the objects.

FIG. 2 also shows a CIS layer 130' with a plurality of CIS 131'. In an embodiment, lenses 121' in optics array layer 120' are formed on respective CIS 131' in CIS layer 130'. In an embodiment, the lenses 121' may be formed by 3D printing.

Ordinarily skilled artisans will appreciate that judicious CIS, optics, and filter selections will enable the tailoring of camera performance (resolution, frame speed, exposure format, focal length, and image size) towards specific applications (imaging or diffraction), without requiring undue experimentation. Depending on the application, different optics arrays may be used. In an embodiment, an optics array may be tuned to provide different fields of view or different directional focus to enable the formation of different images, such as stereoscopic images, 3D images, and different views of an object to be imaged.

There are a number of ways of providing a gigapixel camera, depending on the embodiment. As described earlier, FIGS. 1 and 2 show embodiments for a camera, a 3D camera, and an X-ray camera in which CIS are tiled in a single layer.

Figure 3A:
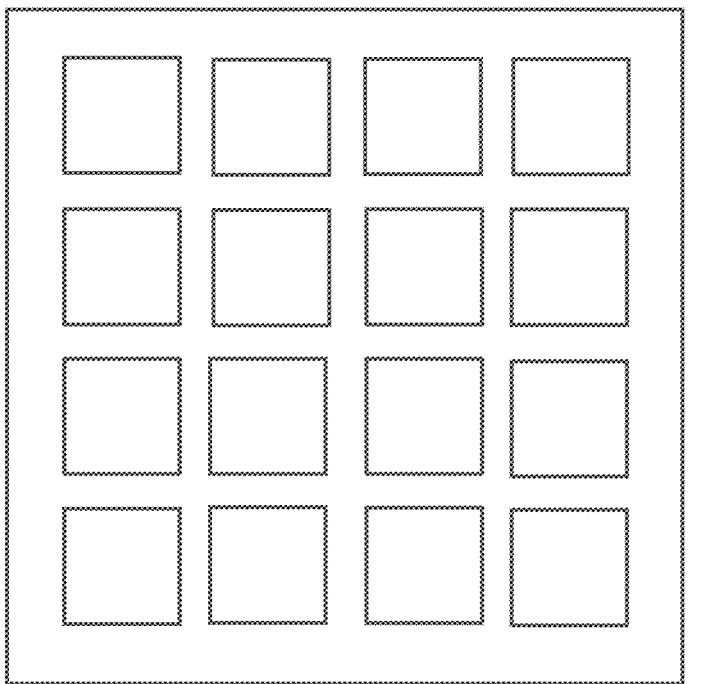
FIGS. 3A to 3C depict arrangements of elements of a GIPC-3D camera according to an embodiment.
Figure 3B:
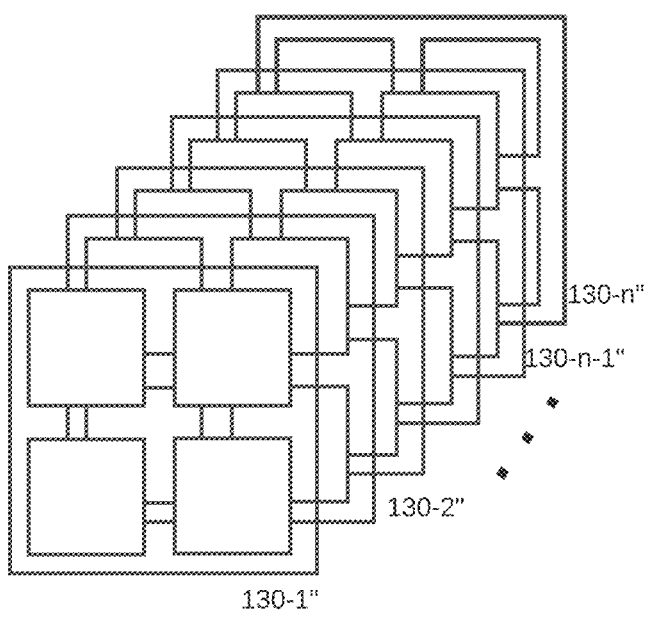

FIG. 3A shows a planar CIS tiling configuration for a CIS array layer (e.g., 130'), similar to that shown in FIGS. 1 and 2. Where CIS tiling configuration 130' is compact, it can be possible to increase the X-ray detection aperture, which would be proportional to the number of CIS and the individual sensor area. A stacked tiling configuration of CIS array layers 130'1", 130-2", . . . , 130-$n$-1", 130-$n$", as in FIG. 3B can increase the aperture for high-energy X-rays above 20 keV that can penetrate through multiple layers of CIS. High-energy X-rays and gamma rays (on the order of MeV) are expected from runaway electrons in tokamaks and by nuclear fusion. In a stacked configuration, each layer may have sufficient CIS of sufficient size to constitute an X-ray camera of a gigapixel or more. Providing different layers will capture radiation of different energies in the same format allowing for wide spectrum imaging of objects using a single device. Embodiments for example allow for capturing 3D or spectroscopic images using a wide spectrum of X-rays (e.g., X-rays having wavelengths anywhere between about 0.01 to about 10 nanometers) or in some embodiments X-rays and visible light.

Figure 3C:
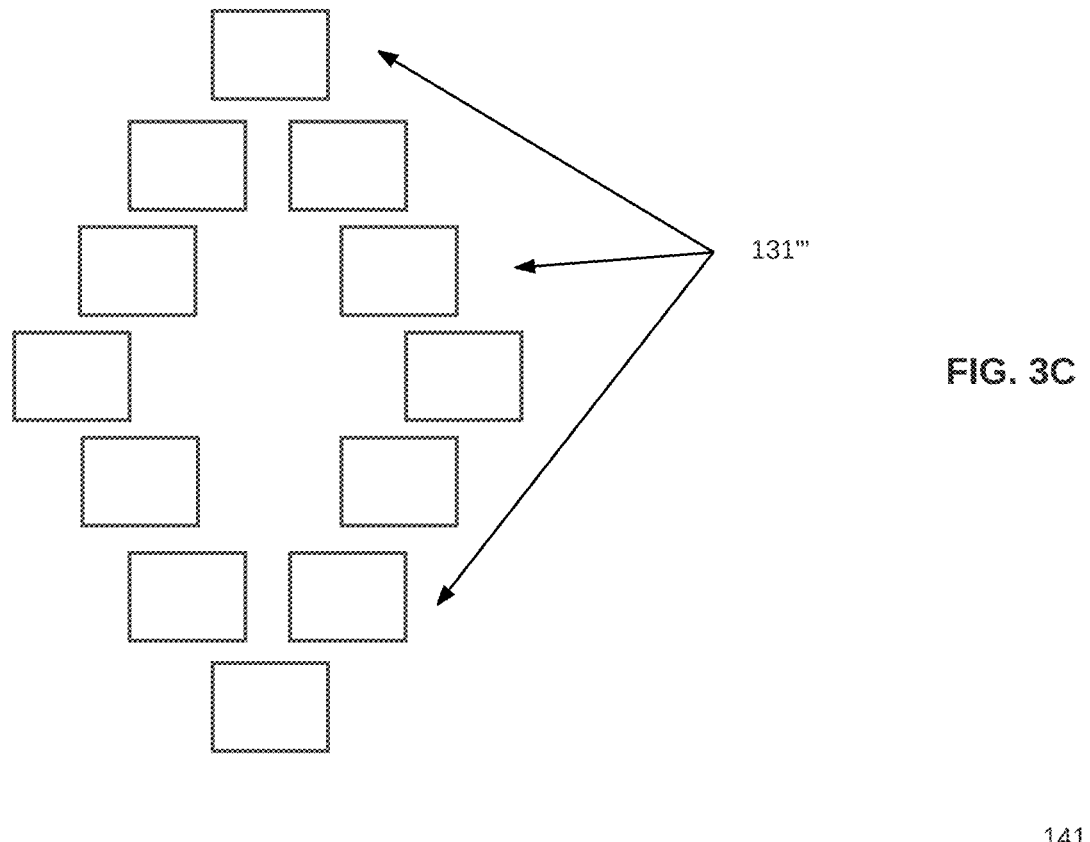

The configuration of CIS 131'" in FIG. 3C can be used in a toroidal plasma device such as a tokamak or a stellarator. Synchrotron radiation from runaway electrons in a torus, as well as bulk X-ray emissions, can be captured by a plurality of CIS arrays surrounding the plasma in the poloidal plane. The number of CIS arrays may be such that the total number of pixels exposed to radiation exceeds a gigapixel. Ordinarily skilled artisans will appreciate that the larger the number of pixels, the greater the resolution of 3D and/or stereoscopic images that are possible. By providing CIS arrays in multiple lines of sight, embodiments provide for capturing stereoscopic images, including wide-spectrum X-ray spectroscopic images of objects.

Figure 4:
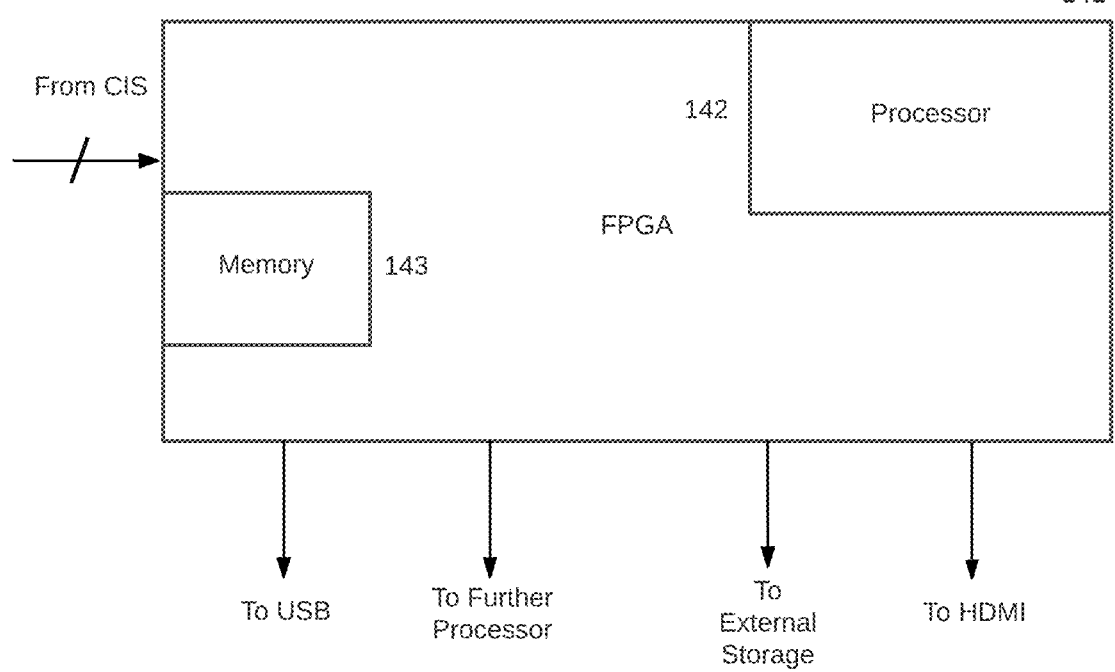
FIG. 4 is a high-level diagram of electronics for processing image data according to an embodiment.

FIG. 4 shows an exemplary FPGA 141-$i$ from FPGA and memory layer 140 that may be used in embodiments. Such an FPGA may include a processor 142 and a memory 143. In an embodiment, inputs from one or more CIS in CIS array layer 130 may come into FPGA 141-$i$ via data transmission and control apparatus 180, and may be processed according to one or more algorithms run on processor 142. Depending on embodiments, outputs from FPGA 141-$i$ may be provided to displays via USB or HDMI, to a further processor, or to external storage.

Figure 5:
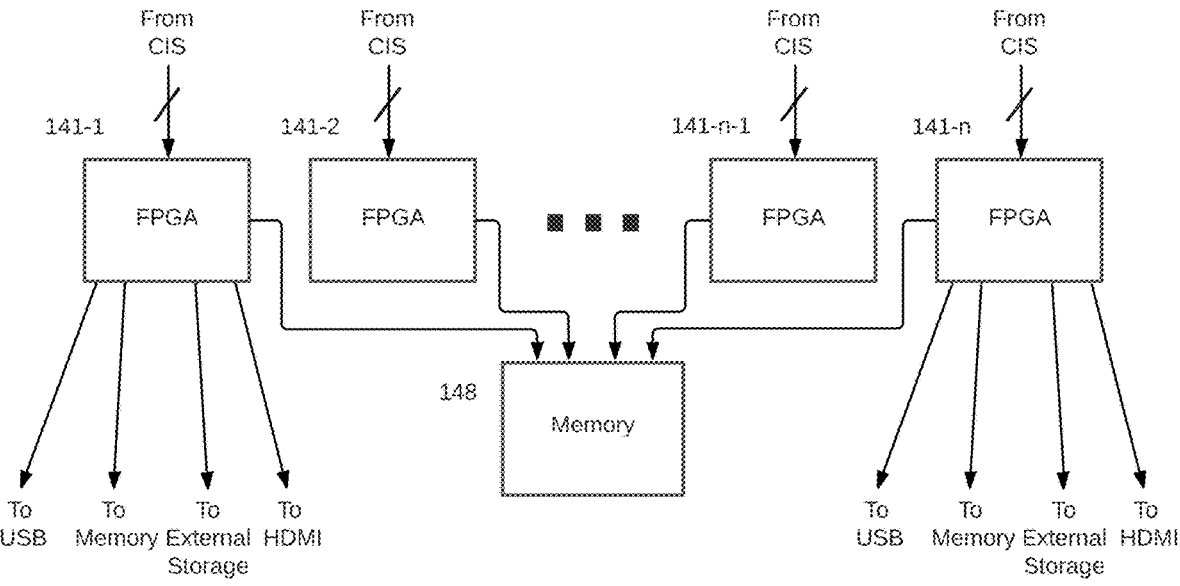
FIG. 5 is a high-level diagram of electronics for processing image data according to an embodiment.

FIG. 5 shows an exemplary configuration for FPGA and memory array layer 140. In FIG. 5, each of a plurality of FPGA 141-1, 141-2, . . . 141-$n$-1, 141-$n$ receives input from one or more CIS in CIS array layer 130 via data transmission and control apparatus 180. The FPGA in FIG. 5 may share a single memory 148 in FPGA and memory array layer 140. Alternatively, there could be more than one memory 148, shared by fewer than all of the FPGA. In an embodiment, there may be one memory 148 for each FPGA 141.

Figure 6:
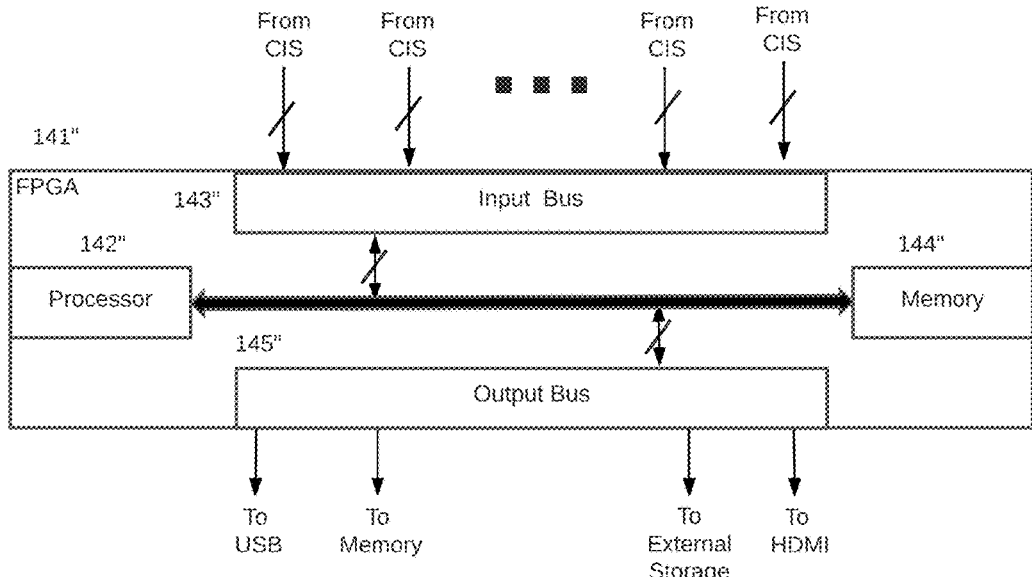
FIG. 6 is a high-level diagram of electronics for processing image data according to an embodiment.

FIG. 6 shows another exemplary configuration for FPGA and memory array layer 140, in which an FPGA 141" receives inputs from multiple CIS via data transmission and control apparatus 180 over an input bus 144". Processor 142" and memory 143" communicate with each other over a bus. The inputs from multiple CIS may be handled on the processor-memory bus, and may be output via an output bus 145" to displays via USB or HDMI, or to a further processor, or to external storage.

FIG. 7 is a high-level flow chart depicting a method, according to embodiments. The method may be performed, for example, by a GIPC 3D camera according to embodiments. Ordinarily skilled artisans will appreciate that the sequence in FIG. 7 may be altered depending on the application, so that different elements in FIG. 7 may be altered in sequence, or selectively removed.

At 705, a wide-spectrum radiation conversion array layer is provided, enabling production of various types of images as discussed previously. At 715, an optics array layer is provided, again enabling provision of different types of images, including views which may be stereoscopic, or 3D, or otherwise. At 725, a CIS gigapixel array layer may be provided, constituted in various ways as described above. At 735, a memory layer, which may be an FPGA layer as previously described, may be provided for the storage of images. At 745, data transmission and control apparatus and/or circuitry may be provided to enable manipulation of the various layers just mentioned, thereby yielding different potential views, including 3D, stereoscopic, or other views.

At 755, various elements in the layers just mentioned and previously described may be combined to provide broad spectrum imaging, including broad spectrum X-ray imaging according to embodiments. At 765, image generation may be initiated, including exposure of elements in the CIS array layer. At 775, gigapixel images, including stereoscopic and/or 3D images, may be produced as described previously.

FIG. 7 includes various elements which have been described previously. Ordinarily skilled artisans will appreciate that image production may be broken out into various elements as discussed, and may be separated from the provision of the various layers constituting the imaging camera described herein.

The imaging camera described herein has a wide range of applications depending on embodiments. Applications may include, but are not limited to surveillance (including landscape photography), agriculture, remote sensing, historic preservation, astronomy, medical uses, machine vision, and industrial non-destructive testing. Ordinarily skilled artisans will appreciate that there may be other applications. More specific non-limiting examples may include corrosion detection in pipes and pipelines of various types, and quality verification of machined parts of various types, from standard parts to advanced parts for use in multiple industries.

Among other embodiments, ordinarily skilled artisans will appreciate that larger images such as petapixel images can be obtained through repetitive imaging of a gigapixel hardware.

While the invention has been described in detail above with reference to several embodiments, ordinarily skilled artisans will appreciate that variations within the scope and spirit of the invention are possible. Accordingly, the invention should be construed as limited only by the scope of the following claims.

What is claimed is:

1. An imaging device comprising:
   an X-ray and multi-spectral radiation conversion array layer comprising a plurality of radiation converters;
   an optics array layer comprising a plurality of optical elements;
   a complementary metal-oxide-semiconductor imaging sensors (CIS) array layer comprising a plurality of CIS, each of the plurality of CIS comprising a plurality of megapixels;

a memory layer; and a data transmission and control apparatus, connected between the CIS array layer and the memory layer, wherein the data transmission and control apparatus controls transmission of data from the CIS in the CIS array layer to the memory layer, wherein the memory layer executes one or more algorithms to process the data to produce a gigapixel image in a single exposure of the CIS in the CIS array layer, wherein:

the plurality of radiation converters in the radiation conversion array layer and the plurality of optical elements in the optics array layer are arranged such that the imaging device is a X-ray plenoptic device.

2. The imaging device of claim 1, wherein the plurality of radiation converters in the radiation conversion array layer and the plurality of optical elements in the optics array layer are configured such that the imaging device generates three-dimensional (3D) X-ray images.

3. The imaging device of claim 1, wherein the plurality of radiation converters in the radiation conversion array layer and the plurality of optical elements in the optics array layer are configured such that the imaging device generates stereoscopic X-ray images.

4. The imaging device of claim 1, wherein the plurality of radiation converters in the radiation conversion array layer and the plurality of optical elements in the optics array layer are configured such that the imaging device generates images using a wide spectrum of X-rays.

5. The imaging device of claim 1, wherein the radiation conversion array layer comprises a plurality of filters, wherein at least some of the plurality of filters are different from each other.

6. The imaging device of claim 1, wherein the optics array layer comprises a plurality of lenses, wherein there are as many filters in the radiation conversion array layer as there are lenses, and there are as many CIS in the CIS array layer as there are lenses.

7. The imaging device of claim 5, wherein each of the lenses in the optics array layer is formed directly on a respective CIS in the CIS array layer.

8. The imaging device of claim 1, wherein each of the lenses in the optics array layer is positioned relative to a respective CIS in the CIS array layer to provide different perspective views of an image being recorded.

9. The imaging device of claim 1, wherein the optical elements in the optics array layer comprise metasurface lenses.

10. The imaging device of claim 1, further comprising an isolation layer between the radiation conversion array layer and the optics array layer, wherein the isolation layer comprises a plurality of guide tubes.

11. The imaging device of claim 1, wherein the radiation conversion array layer is disposed over the optics array layer.

12. The imaging device of claim 1, further comprising an isolation layer between the optics array layer and the CIS array layer, wherein the isolation layer comprises a plurality of guide tubes.

13. The imaging device of claim 1, wherein the optics array layer is disposed over the radiation conversion array layer.

14. The imaging device of claim 1, further comprising an isolation layer between the radiation conversion array layer and the CIS array layer, wherein the isolation layer comprises a plurality of guide tubes.

15. The imaging device of claim 1, wherein one or more of the radiation conversion array layer, the optics array layer, and the CIS array layer is planar.

16. The imaging device of claim 1, wherein one or more of the radiation conversion array layer, the optics array layer, and the CIS array layer is curved.

17. The imaging device of claim 1, wherein the radiation conversion array layer comprises a plurality of scintillation converters.

18. The imaging device of claim 17, wherein the optics array layer comprises a plurality of pinhole elements, wherein there are as many scintillation converters in the radiation conversion array layer as there are pinhole elements.

19. The imaging device of claim 17, wherein the plurality of CIS are arranged in more than one layer.

20. The imaging device of claim 17, wherein the optics array layer comprises a plurality of pinhole elements and a plurality of coded apertures, wherein there are as many scintillation converters in the radiation conversion array layer as there are pinhole elements and coded apertures.

* * * * *